United States Patent [19]

Ando et al.

[11] Patent Number: 5,373,355
[45] Date of Patent: Dec. 13, 1994

[54] IMPERFECT REGISTER CORRECTING METHOD TO BE CARRIED OUT ON A MULTICOLOR IMAGE FORMING APPARATUS

[75] Inventors: Ryo Ando; Kozo Tagawa; Hirotaka Mori, all of Kanagawa, Japan

[73] Assignee: Fuji Xerox Co., Ltd., Tokyo, Japan

[21] Appl. No.: 92,620

[22] Filed: Jul. 16, 1993

[30] Foreign Application Priority Data

Jul. 17, 1992 [JP] Japan ............... 4-190672

[51] Int. Cl.$^5$ ............................. G03G 15/01
[52] U.S. Cl. ..................... 355/327; 346/157
[58] Field of Search ............ 355/271, 327, 326 R; 346/157; 358/526

[56] References Cited

U.S. PATENT DOCUMENTS

| | | | |
|---|---|---|---|
| 4,903,067 | 2/1990 | Murayama et al. | 355/271 X |
| 4,912,491 | 3/1990 | Hoshino et al. | 346/157 X |
| 4,937,664 | 6/1990 | Chika et al. | 355/327 X |

FOREIGN PATENT DOCUMENTS

64-88471  4/1989  Japan .
1-142671  6/1989  Japan .
1-142674  6/1989  Japan .

*Primary Examiner*—Joan H. Pendegrass
*Attorney, Agent, or Firm*—Finnegan, Henderson, Farabow, Garrett & Dunner

[57] ABSTRACT

An imperfect register correcting method is applied to correcting the incorrect disposition and functions of the components of a multicolor image forming apparatus which forms a multicolor image by sequentially superposing color images formed by a plurality of image forming units thereof, causing imperfect register of the color images formed by the plurality of image forming units. The imperfect register correcting method comprises a first imperfect register correcting cycle in which skews of the image forming units are corrected, and a second imperfect register correcting cycle in which factors of imperfect register other than the skews are corrected. The second imperfect correcting cycle is carried out subsequent to the first imperfect register correcting cycle to obviate the introduction of errors into data for correcting the factors of imperfect register by the correction of the skew of the image forming units.

2 Claims, 5 Drawing Sheets

IMPERFECT REGISTER CORRECTING METHOD TO BE CARRIED OUT ON A MULTICOLOR IMAGE FORMING APPARATUS

BACKGROUND OF THE INVENTION

1. Field of the Invention

The present invention relates to an imperfect register correcting method to be carried out on a multicolor image forming apparatus having a plurality of image forming units capable of sequentially transferring color images in register in a superposed arrangement on a recording medium to form a multicolor image on the recording medium.

2. Description of the Prior Art

The use of color documents in offices has rapidly become prevalent in recent years and color image forming apparatus for producing color documents, including color copying machines, color printers and color facsimile equipments have rapidly become widespread. The enhancement of the operating speed of the color image forming apparatus is the trend of the times.

A so-called tandem color printer is an example of a high-speed color image forming apparatus. The tandem color printer is provided with four ROSs (raster output scanners), i.e., image forming units, respectively for forming, for example, an yellow (Y) image, a magenta (M) image, a cyan (C) image and a black (K) image. The tandem color printer superposes four color images formed sequentially by the ROSs to form a multicolor image efficiently. When the tandem color printer jams or malfunctions, some of the ROSs are removed or displaced, recording sheets clogging the tandem color printer are removed or faulty parts are repaired or replaced, and then the removed or displaced ROSs are restored to their original positions. However, the ROSs are not necessarily restored correctly to their original positions. If the ROSs are dislocated from the correct positions, the superposed color images are imperfectly registered.

Factors that cause imperfect register are dislocation of the ROS with respect to the scanning direction, dislocation of the ROS with respect to the feed direction, i.e., the direction of advancement of the recording sheet, incorrect scanning width, i.e., deviation of the image in size with respect to the scanning direction, angular deviation of the scanning direction, i.e., skew of the ROS.

An imperfect register correcting method is disclosed in Japanese Patent Laid-open (Kokai) No. Hei. 1-142671. According to this known imperfect register correcting method, a register mark is formed by each of a plurality of ROSs, the register mark generator of each ROS generates the image of the register mark according to a specific rule to form the image of the register mark on the conveyor belt, the image of the register mark is sampled at predetermined moments by CCD image sensors to obtain register mark data. Therefore, the positional differences of the register marks formed by the ROSs containing such as dislocations of the ROSs with respect to the scanning direction, dislocations of the ROSs with respect to the feed direction, incorrect scanning width of the ROSs and skews of the ROSs are corrected at once on the basis of the calculated positional differences between the register marks.

However, when the skew is corrected, at least one of the factors of imperfect register, i.e., dislocation with respect to the scanning direction, dislocation with respect to the feed direction and incorrect scanning width, changes. Therefore, if the changed factor is corrected on the basis of corrections calculated on the basis of the register mark data sampled before the correction of the skew, the factor cannot be corrected exactly and hence perfect correction of imperfect register is impossible; that is, since secondary errors are introduced additionally into the factors of imperfect register by the correction of the skew, the secondary errors remain uncorrected even if the factors are corrected on the basis of the corrections calculated on the basis of the register mark data sampled before the correction of the skew.

Figure 5:
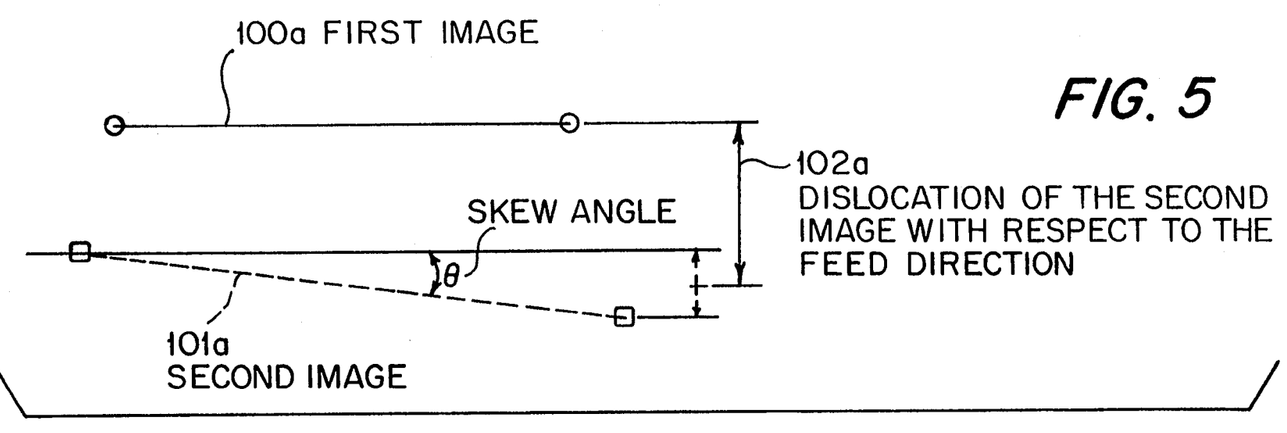
FIG. 5 is a diagrammatic view of assistance in explaining a conventional imperfect register correcting method, showing images formed by two image forming units at a stage before skew correction.
Figure 6:
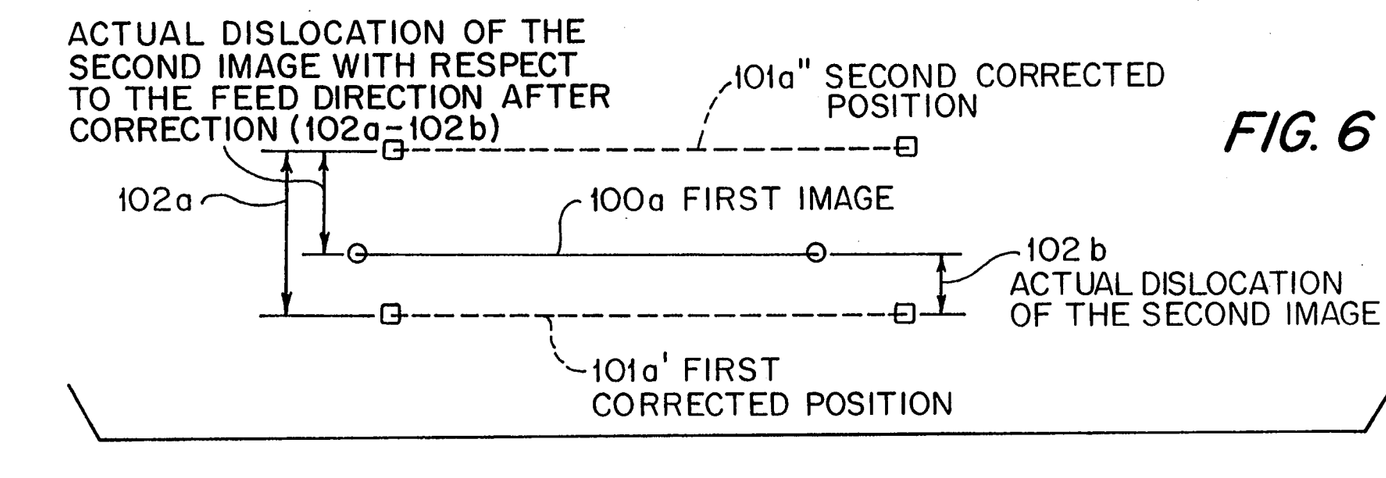
FIG. 6 is a diagrammatic view of assistance in explaining the same conventional imperfect register correcting method, showing the images shown in FIG. 5 at a stage after skew correction.

The secondary errors will be described concretely with reference to FIGS. 5 and 6 showing the images of two register marks in terms of the effect of skew correction on the dislocation of the images with respect to the feed direction. Referring to FIG. 5, a first image 100a, i.e., the image of a first register mark, and a second image 101a, i.e., the image of a second register mark, are formed on the basis of the image data obtained by sampling. The second image 101a is skewed at a skew angle ▌ with respect to the first image 100a and dislocated by a dislocation 102a from the first image 100a. If the skew angle ▌ of the second image 101a is corrected, the second image is shifted to a first corrected position 101a'. The second image 101a at the first corrected position 101a' is dislocated with respect to the feed direction by a dislocation 102b from the first image 100a. Thus, the dislocation 102b of the second image 101a at the first corrected position 101a' from the first image 100a with respect to the feed direction differs considerably from the dislocation 102a of the second image 101a from the first image 100a calculated on the basis of the image data sampled before skew correction. If the dislocation of the second image 101a at the first corrected position 101a' is corrected subsequent to skew correction on the basis of a correction determined on the basis of the dislocation 102a calculated on the basis of the image data sampled before skew correction, the second image 101a is shifted to a second corrected position 101a'' as shown in FIG. 6, in which the second image 101a is still dislocated with respect to the feed direction from the first image 100a by a dislocation equal to the difference between the dislocations 102a and 102b. Thus, the positional error of the second image 101a with respect to the feed direction cannot be correctly corrected if the dislocation of the second image 101a with respect to the feed direction is corrected after skew correction on the basis of the dislocation 102a calculated on the basis of the image data sampled before skew correction. This known imperfect register correcting method, which corrects the factors of imperfect register on the basis of the image data sampled before skew correction, is unable to precisely correct other factors of imperfect register as well as the dislocation with respect to the feed direction.

Even if a skew correcting mechanism capable of correcting the skew of an image without affecting other factors of imperfect register is available, the skew correcting mechanism will be very complex and very expensive.

SUMMARY OF THE INVENTION

Accordingly, it is an object of the present invention to provide an imperfect register correcting method for correcting the imperfect register of images formed by a multicolor image forming apparatus, capable perfectly correcting the factors of imperfect register without being adversely effected by skew correction carried out prior to the correction of the factors of imperfect register other than the skew of the image forming units.

In one aspect of the present invention, an imperfect register correcting method for correcting imperfect register of images formed by a multicolor image forming apparatus which forms a multicolor image by sequentially superposing color images formed by a plurality of image forming units thereof comprises steps of forming images of specific register marks by pattern generators included in the plurality of image forming units on a recording sheet transporting device included in the multicolor image forming apparatus, obtaining register mark data by reading the images of the register marks by image sensors, calculating corrections on the basis of the differences of the register mark data representing the positions of the images of the register marks formed by the image forming units excluding one specified image forming unit among the plurality of image forming unit from the register mark data representing the position of the image of the register mark formed by the specified image forming unit, and correcting the position of each image forming unit in respect of dislocation with respect to the scanning direction, dislocation with respect to the feed direction, incorrect scanning width and skew. When correcting imperfect register, the register mark data for the correction of the skew and that for the correction of the factors of imperfect register other than the skew are obtained respectively in different imperfect register correcting cycles.

Thus, the correction of the factors of imperfect register other than the skew is carried out independently of the correction of the skew on the basis of the register mark data in an imperfect register correcting cycle other than that for obtaining the register mark data for the correction of the skew, and hence the correction of the factors of imperfect register other than the skew is not effected by the correction of the skew. Accordingly, all the factors of imperfect register can be accurately corrected.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
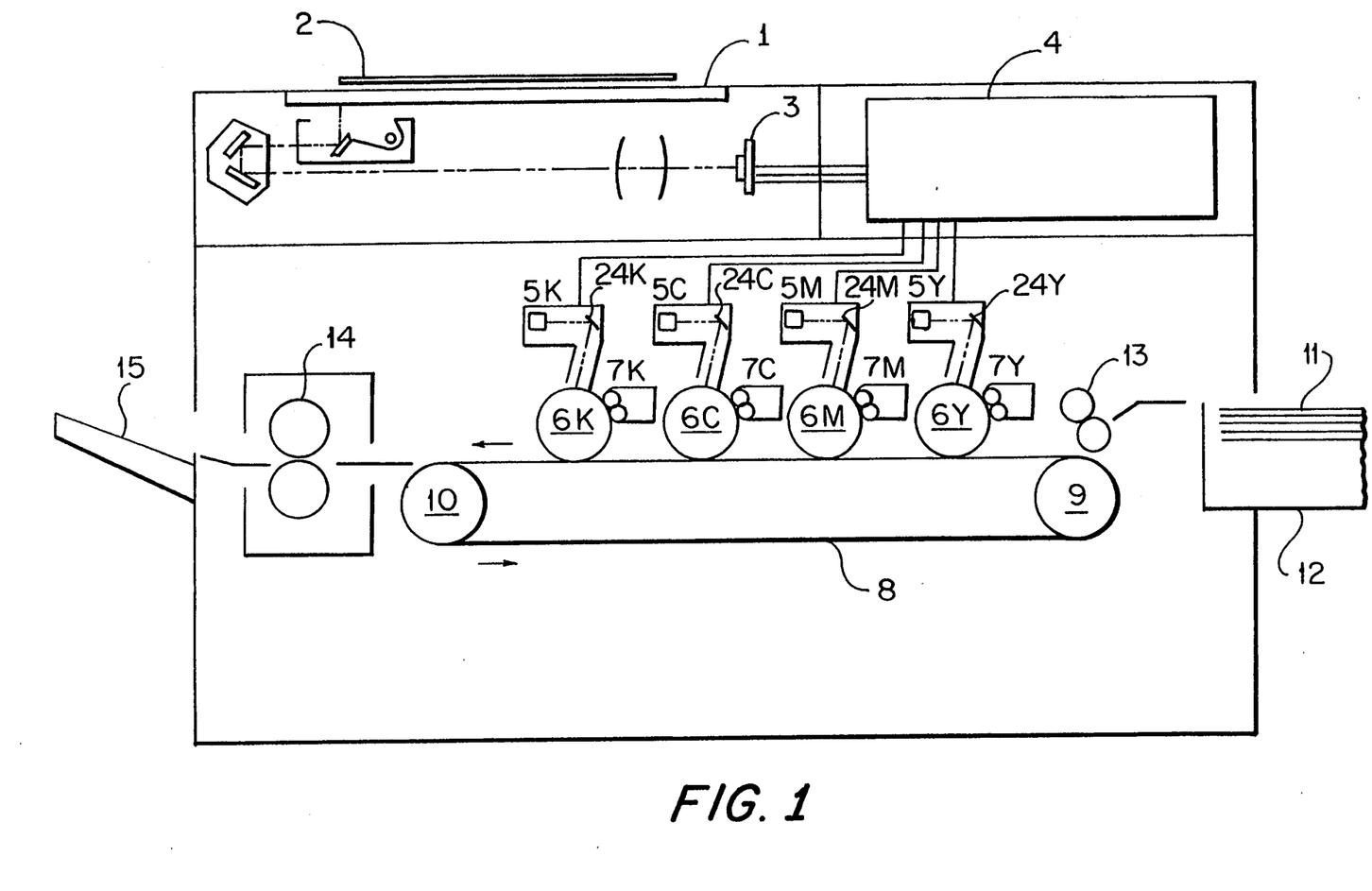
FIG. 1 is a schematic sectional view of a digital multicolor copying machine of a superposing transfer system provided with a plurality of tandem image forming units to which an imperfect register correcting method in a preferred embodiment according to the present invention is applied.

Referring to FIG. 1, in a digital multicolor copying machine, an image scanner provided with a color CCD image sensor 3 samples the image of a document 2 placed on a platen 1 and provides an analog signal R representing the red component of the image, an analog signal G representing the green component of the image, and an analog signal B representing the blue component of the image. An image processing unit 4 converts the analog signals R, G and B into an yellow image signal Y, a magenta image signal M, a cyan image signal C and a black image signal K, stores the image signals Y, M, C and K temporarily in a storage included therein, and sends the image signals Y, M, C and K respectively to an yellow scanning device 5Y, a magenta scanning device 5M, a cyan scanning device 5C and a black scanning device 5K. Then, the scanning devices 5Y, 5M, 5C and 5K scan corresponding photoconductive drums 6Y, 6M, 6C and 6K to form electrostatic latent images on the photoconductive drums 6Y, 6M, 6C and 6K, respectively. Developing devices 7Y, 7M, 7C and 7K combined respectively with the photoconductive drums 6Y, 6M, 6C and 6K develop the electrostatic latent images in visible color images.

The yellow scanning device 5Y, the yellow photoconductive drum 6Y and the yellow developing device 7Y form, in combination, an yellow image forming unit. The magenta scanning device 5M, the magenta photoconductive drum 6M and the magenta developing device 7M form, in combination, a magenta image forming unit. The cyan scanning device 5C, a cyan photoconductive drum 6C and the cyan developing device 7C form, in combination, a cyan image forming unit. The black scanning device 5K, the black photoconductive drum 6K and the black developing device 7K form, in combination, a black image forming unit. The scanning devices may be either laser beam scanning devices or LED scanning devices.

Recording sheets 11 stored in a sheet feed tray 12 are fed onto a sheet transporting belt 8 one by one by a feed roller 13 according to a sheet feed signal. The sheet transporting belt is formed of a transparent, dielectric material and extended at a specified tension between a driving roller 9 driven by a constant-speed motor, not shown, and a driven roller 10. The sheet transporting belt 8 is turned counterclockwise, as viewed in FIG. 1, to transport the recording sheet 11 via the photoconductive drums 6Y, 6M, 6C and 6K. The recording sheet 11 fed onto the sheet transporting belt 8 is attracted to the sheet transporting belts 8. The visible yellow, magenta, cyan and black images are transferred sequentially in that order respectively from the photoconductive drums 6Y, 6M, 6C and 6K to the recording sheet 11.

The transportation of the recording sheet 11 by the sheet transporting belt 8, and the operation for forming the electrostatic latent image on the yellow photoconductive drum 6Y are timed so that the leading edge of the recording sheet 11 and the leading edge of the electrostatic latent image formed on the yellow photoconductive drum 6Y coincide with each other at an yellow image transfer position corresponding to the line of contact between the sheet transporting belt 8 and the circumference of the yellow photoconductive drum 6Y. At the image transfer position, the yellow visible image is transferred from the yellow photoconductive drum 6Y to the recording sheet 11 by the agency of a transfer corona discharger or the like. At a magenta image transfer position, the magenta visible image is transferred in a similar manner from the magenta photoconductive drum 6M to the recording sheet 11 so as to be superposed on the yellow visible image. Similarly, the cyan visible image and the black visible image are transferred at a cyan image transfer position and a black image transfer position from the cyan photoconductive drum 6C and the black photoconductive drum 6K, respectively, to the recording sheet 11 so as to be superposed on the yellow and magenta visible images formed previously on the recording sheet 11. Thus, the yellow, magenta, cyan and black visible images are transferred sequentially from the photoconductive drums 6Y, 6M, 6C and 6K to the recording sheet 11 in a superposed relation to form a multicolor image on the recording sheet 11.

After all the color visible images have been transferred to the recording sheet 11, the recording sheet 11 is further advanced by the sheet transporting belt 8, separated from the sheet transporting belt 8 at a position near the driven roller 10 by the agency of a corona discharger or a sheet stripper, and delivered to a fixing unit 14, which fixes the multicolor image to the recording sheet 11 and delivers the recording sheet 11 to a delivery tray 15.

Figure 2:
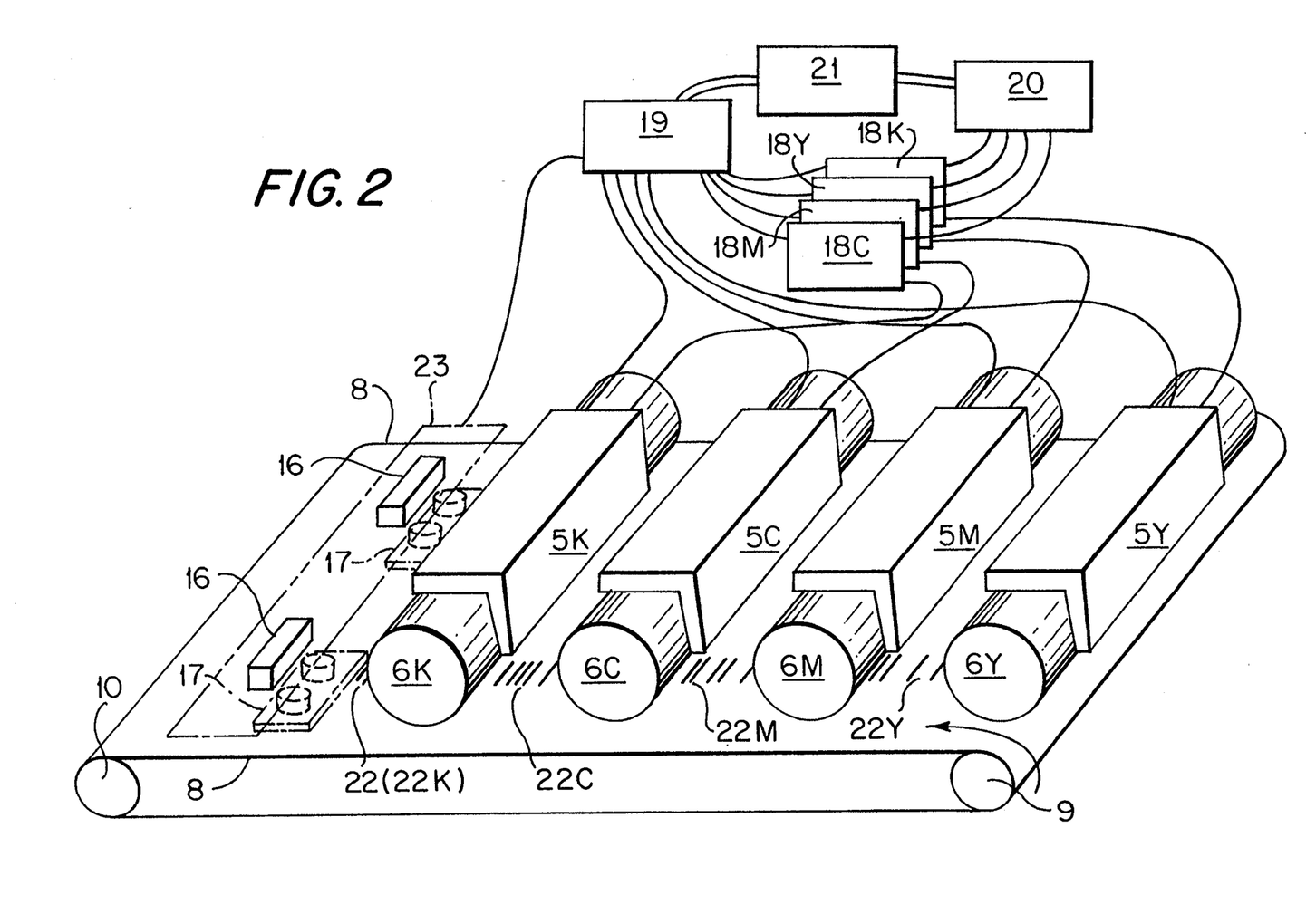
FIG. 2 is a schematic perspective view of an imperfect register correcting system incorporated into the digital multicolor copying machine of FIG. 1.

FIG. 2 shows an imperfect register correcting system for carrying out the imperfect register correcting method embodying the present invention. The imperfect register correcting system corrects the imperfect register of the color visible images attributable to the minute dislocation of the photoconductive drums and/or the variation of image transfer timing caused by an external force or temperature variation. The imperfect register correcting system has a detecting unit 23 comprising a pair of image sensors 16 disposed above the sheet transporting belt 8 opposite to positions near the side edges of the sheet transporting belt 8, respectively, and a pair of light sources 17 disposed under the upper side of the sheet transporting belt 8 opposite to the image sensors 16 to illuminate register marks formed on the sheet transporting belt 8, respectively. The image sensors 16 may be, for example, CCD image sensors, and the light sources 17 may be, for example, LEDs (light emitting diodes) or halogen lamps. The luminous intensity of the light sources 17 can optionally be adjusted to compensate the reduction of luminous intensity due to the deterioration of their performance, the deterioration of the transparency of the sheet transporting belt 8 and/or the variation of the environmental conditions including the environmental temperature for the optimum illumination of the register marks.

The imperfect register correcting system comprises, in addition to the detecting unit 23, interfaces 18Y, 18M, 18C and 18K formed on printed wiring boards to send image signals respectively to the scanning devices 5Y, 5M, 5C and 5K, an imperfect register correcting unit 19 formed on a printed wiring board, an image processing unit 20 formed on a printed wiring board, and a control unit 21 formed on a printed wiring board to control the operation of the imperfect resister correcting system.

The imperfect register correcting system starts an imperfect register correcting cycle when the image forming unit or the image forming units are removed from the digital multicolor copying machine to remove recording sheets clogging the digital multicolor copying machine and put on the digital multicolor copying machine after removing the recording sheet or when the temperature within the digital multicolor copying machine rises beyond a predetermined temperature.

In the imperfect register correcting cycle, first the control unit 21 gives command signals to the interfaces 18Y, 18M, 18C and 18K, the imperfect register correcting unit 19 and the image processing unit 20. Then, the interfaces 18Y, 18M, 18C and 18K function as pattern generators to generate register mark forming signals representing register marks and send the register mark forming signals to the scanning devices 5Y, 5M, 5C and 5K of the image forming units. Register marks 22Y, 22M, 22C and 22K formed on the photoconductive drums 6Y, 6M, 6C and 6K are transferred to the sheet transporting belt 8, and the imperfect register correcting unit 19 prepares for sampling the register marks 22Y, 22M, 22C and 22K formed on the sheet transporting belt 8.

When the imperfect register correcting cycle is started, first the yellow interface 18Y gives the register mark forming signal for forming the yellow register marks 22Y to the yellow scanning device 5Y, the yellow scanning device 5Y forms electrostatic latent images corresponding to the register mark forming signal on the photoconductive drum 6Y, the electrostatic latent images are developed by the developing device 7Y in visible yellow register mark images, and then the visible yellow register mark images are transferred to the sheet transporting belt 8 to form yellow register marks 22Y at positions near the opposite side edges of the sheet transporting belt 8.

Then, a fixed time corresponding to a time interval in which the sheet transporting belt 8 advances by a distance between the yellow image transfer position and the magenta image transfer position after the register mark forming signal for forming the yellow register marks 22Y has been given to the yellow scanning device 5Y, the magenta interface 18M sends a register mark forming signal for forming the magenta register marks 22M to the magenta scanning device 5M. Thus, the magenta register marks 22M are formed, similarly to the yellow register marks 22Y, on the sheet transporting belt 8 at positions near the opposite side edges of the sheet transporting belt 8. The cyan register marks 22C and the black register marks 22K are formed by the same procedure on the sheet transporting belt 8. The register marks 22Y, 22M, 22C and 22K are thus superposed to form register patterns 22.

Upon the arrival of the register patterns 22 at a position directly below the image sensors 16, the light sources 17 illuminate the register patterns 22 and the image sensors 16 forms images of the register patterns 22.

The imperfect register correcting unit 19 monitors at least one of the times when the interfaces 18Y, 18M, 18C and 18K provide the register mark forming signals. The imperfect register correcting unit 19 determines the time when the register patterns 22 arrive directly below the image sensors 16 on the basis of the time when the interface 18Y, 18M, 18C or 18K provides the register mark forming signal, and determines the sampling start time and the sampling end time to provide a time interval sufficient for sampling the register patterns 22 detected by the image sensors 16.

At the sampling start time, the imperfect register correcting unit 19 starts reading image signals provided by the image sensors 16 and storing the image signals in its internal high-speed memory and terminates reading the image signals at the sampling end time. Subsequently, the imperfect register correcting unit 19 determines the positions of the register patterns 22 on the basis of the image signals stored in the high-speed memory by a method of elastic center or the like and stores the positions of the register patterns 22 as image position addresses in a main memory. This procedure is repeated to determine a plurality of definite image position addresses for each image forming unit. To obtain accurate definite image position addresses, the plurality of definite image position addresses for each image forming unit may be averaged.

Then, the imperfect register correcting unit 19 processes the definite image position addresses for each image forming unit by a predetermined algorithm to calculate corrections for a plurality of imperfect register parameters for each image forming unit. The corrections thus obtained are set directly or indirectly for the scanning devices 5Y, 5M, 5C and 5K and the interfaces 18Y, 18M, 18C and 18K. In this register correcting cycle, the skew of each image forming unit is corrected with respect to the other image forming units. Thus, calculations for correcting the skew of one specified image forming unit need not be made. Corrections to the other image forming units may be made with respect to the one specified image forming unit. The imperfect register parameters are the dislocation of the scanning device with respect to the scanning direction, the dislocation of the scanning device with respect to the feed direction, a deviation of scanning width, i.e., a deviation of the image in size with respect to the scanning direction, and the skew with respect to the scanning direction.

The skews of the image forming units are corrected by adjusting the angular positions of the respective reflecting mirrors 24Y, 24M, 24C and 24K of the scanning devices 5Y, 5M, 5C and 5K according to the calculated corrections by means of stepping motors. The correction of other factors causing imperfect register are achieved by correcting the scanning start times and the scanning intervals of the scanning devices 5Y, 5M, 5C and 5K in the software according to the calculated corrections.

The imperfect register correcting cycle is repeated twice respectively for correcting the skews and other functions, or factors, of the image forming units due to imperfect register. After correcting the skews in the first imperfect register correcting cycle, the second imperfect register correcting cycle is performed to correct other factors of imperfect register.

Figure 3:
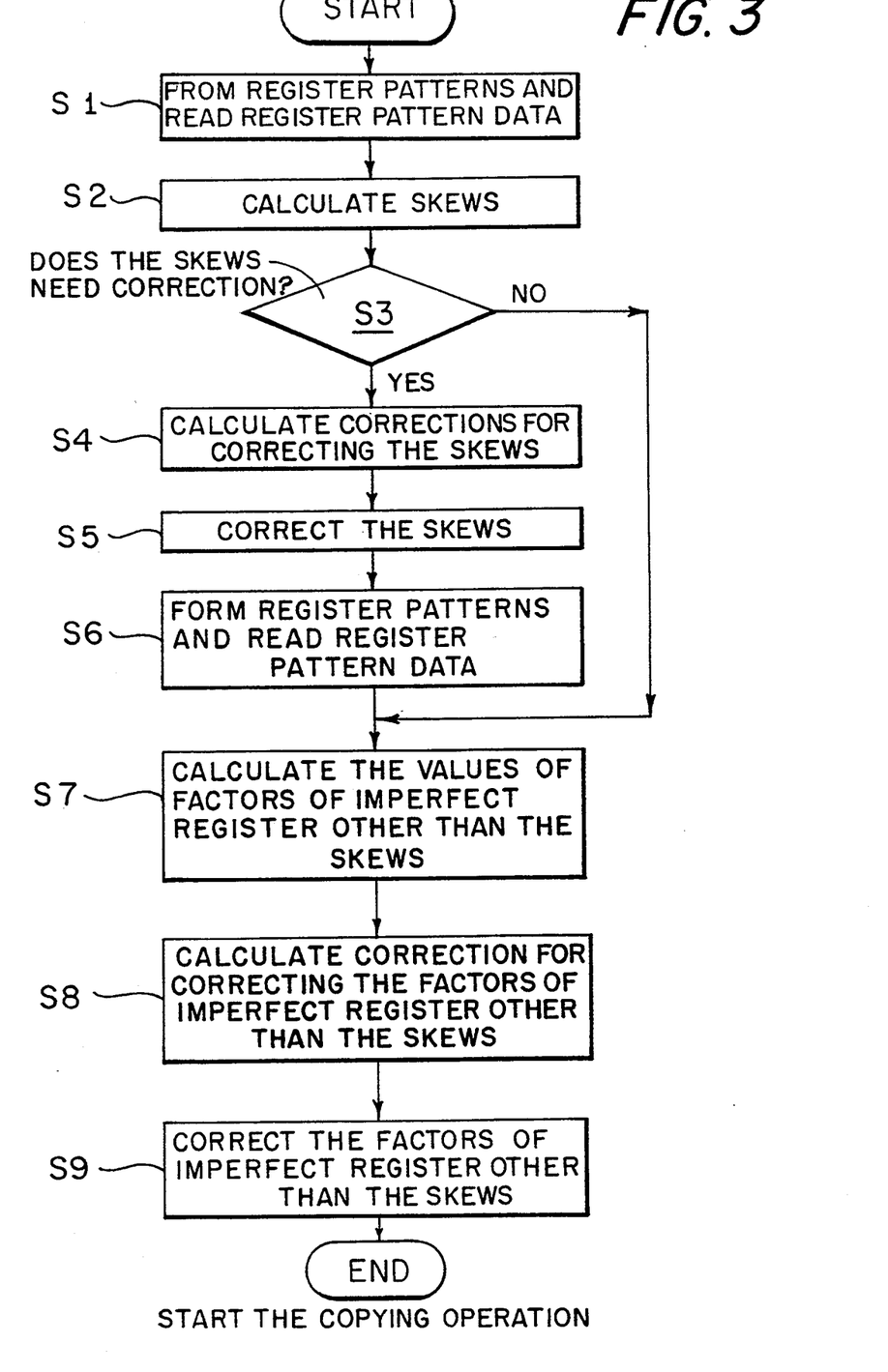
FIG. 3 is a flow chart of an imperfect register correcting procedure to be carried out by the imperfect register correcting method embodying the present invention.

Referring to FIG. 3, after the first incorrect register correcting cycle has been started, images of the register patterns are formed and register mark data representing the values of the factors of imperfect register are determined on the basis of the register patterns data in step S1. Then, the skews are calculated on the basis of the register pattern data in step S2 and the skews are examined in step S3 to see if the skews need correction. If the skews need correction, corrections for correcting the skews are calculated in step S4. The corrections for correcting the skews are angular data for correcting the respective angular positions of the reflecting mirrors 24Y, 24M, 24C and 24K of the scanning devices 5Y, 5M, 5C and 5K. Then, in step S5, the skews are corrected according to the corrections calculated in step S4. When correcting the skews, the angular positions of the reflecting mirrors 24Y, 24M, 24C and 24K are adjusted according to the corrections by means of the stepping motors. When the skews need correction, only the corrections for correcting the skews are calculated.

In step S6, the second imperfect register correcting cycle is carried out, in which images of the register patterns are formed and register pattern data representing the values of the factors of imperfect register are determined on the basis of the register patterns data. The register pattern data obtained in the second imperfect register correcting cycle represents the values of factors of imperfect register after the correction of the skews. Then, in step S7, the values of the factors other than the skews, i.e., the dislocations of the image forming units with respect to the scanning direction, the dislocations of the image forming units with respect to the feed direction and the error in scanning width, are calculated on the basis of the register pattern data, and corrections for correcting the factors of imperfect register are calculated on the basis of the values of the factors in step S8, and then the factors of imperfect register are corrected according to the corrections in step S9, in which the scanning starting times and scanning intervals of the scanning devices 5Y, 5M, 5C and 5K set in the software are corrected. After all the factors of imperfect register have been thus corrected, the normal copying operation of the digital multicolor copying machine is started.

Thus, the factors of imperfect register other than skew are corrected on the basis of the register pattern data obtained after the correction of the skews. Therefore, both the skews and the factors of imperfect register can be accurately corrected.

If it is decided in step S3 that the skews need not be corrected, values of the factors of imperfect register other than the skews are calculated in step S7 on the basis of the register pattern data obtained in the first imperfect register correcting cycle, and then steps S8 and S9 are executed. In this case, the second imperfect register correcting cycle is unnecessary.

Figure 4:
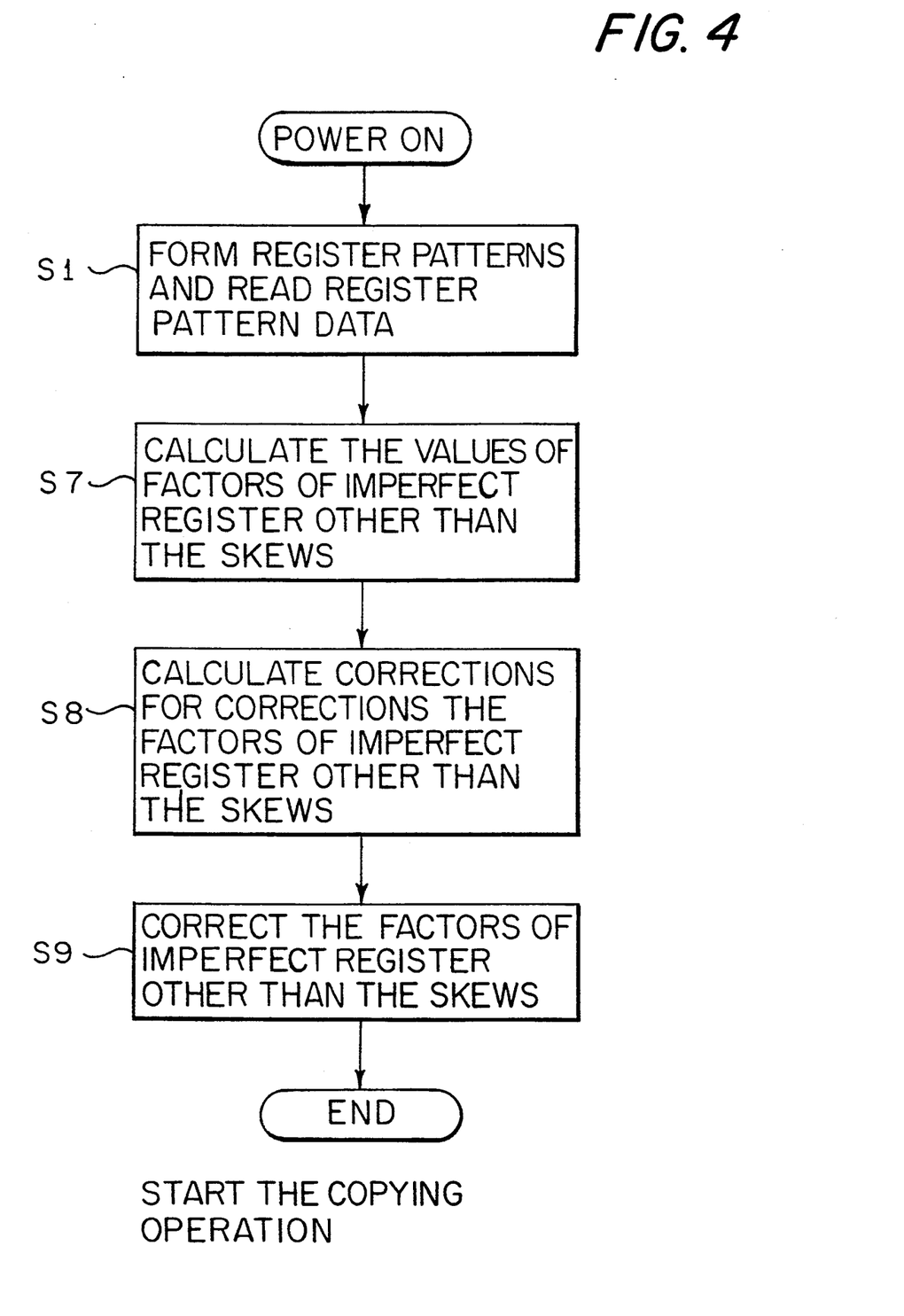
FIG. 4 is a flow chart of an imperfect register correcting procedure to be carried out by an imperfect register correcting method in another embodiment according to the present invention.

Once the skews are corrected, the skew of the image forming units, in general, does not occur any more. Therefore, when the digital multicolor copying machine does not require the removal of the image forming units for removing jamming recording sheets or for repair, an imperfect register correcting procedure as shown in FIG. 4 is carried out to correct imperfect register. Referring to FIG. 4, upon the connection of the digital multicolor copying machine to the power source, steps S1, S7, S8 and S9, which are the same respectively as steps S1, S7, S8 and S9 of the imperfect register correcting procedure shown in FIG. 3, are executed to correct the factors of imperfect register other than the skews and the correction of the skew is omitted.

Since the register pattern data for correcting the factors of imperfect register other than the skews of the image forming units is obtained in an imperfect register correcting cycle carried out after correcting the skews, the register pattern data represents the actual values of the factors of imperfect register. Accordingly, the factors of imperfect register other than the skews can be accurately corrected without being effected by errors that may be introduced into the data by the correction of the skews.

Although the invention has been described in its preferred form with a certain degree of particularity, obviously many changes and variations are possible therein. It is therefore to be understood that the present invention may be practiced otherwise than as specifically described herein without departing the scope and spirit thereof.

What is claimed is:

1. An imperfect register correcting method to be applied to correcting the incorrect disposition and functions of the components of a multicolor image forming apparatus which forms a multicolor image by sequentially superposing color images formed by a plurality of image forming units thereof, causing imperfect register of the color images formed by the plurality of image forming units, said imperfect register correcting method comprising:

a first imperfect register correcting cycle comprising steps of:

forming images of specific register marks generated by pattern generators included in the image forming units by the image forming units on a recording sheet transporting means included in the multicolor image forming apparatus, obtaining register mark data by reading the images of the register marks by image sensors, calculating corrections for correcting skews of the plurality of image forming units on the basis of the differences of the register mark data representing the positions of the images of the register marks formed by the image forming units excluding one specified image forming unit among the plurality of image forming units from the register mark data representing the position of the image of the register mark formed by the specified image forming unit, and correcting the skews of the image forming units excluding the specified image forming unit on the basis of the calculated corrections;

a second imperfect register correcting cycle comprising steps of:

forming images of the specific register marks by the image forming units on the recording sheet transporting means, obtaining register mark data by reading the images of the register marks by the image sensors, calculating corrections for correcting the positions and functions of the image forming units on the basis of the difference of the register mark data representing the positions of the images of the register marks formed by the image forming units excluding the specified image forming unit among the plurality of image forming units from the register mark data representing the position of the image of the register mark formed by the specified image forming unit, and correcting the positions and functions of the image forming units in respect of dislocation with respect to the scanning direction, dislocation with respect to the feed direction, and error in scanning width;

characterized in that the second imperfect register correcting cycle is carried out subsequent to the first imperfect register correcting cycle.

2. An imperfect register correcting method according to claim 1, wherein said recording sheet transporting means is an endless belt formed of a transparent, dielectric material.

* * * * *